United States Patent [19]
Biedermann et al.

[11] Patent Number: 5,383,074
[45] Date of Patent: Jan. 17, 1995

[54] AUTO-REVERSE MAGNETIC-HEAD UNIT HAVING A FLEXIBLE CONDUCTOR BOARD

[75] Inventors: Franz Biedermann; Johann Veigl, both of Vienna, Austria

[73] Assignee: U.S. Philips Corporation, New York, N.Y.

[21] Appl. No.: 963,953

[22] Filed: Oct. 19, 1992

[30] Foreign Application Priority Data

Dec. 11, 1991 [AT] Austria ............................ A 2466/91

[51] Int. Cl.⁶ ........................... G11B 5/55; G11B 21/08
[52] U.S. Cl. ........................................................ 360/106
[58] Field of Search ............... 360/106, 105, 137, 96.3, 360/74.1, 129; 174/151; 117 FF; 248/222.3

[56] References Cited

U.S. PATENT DOCUMENTS

| | | | |
|---|---|---|---|
| 4,432,027 | 2/1984 | Higuchi | 360/105 |
| 4,600,956 | 7/1986 | Nagase | 360/106 |
| 5,003,421 | 3/1991 | Kido | 360/106 |

FOREIGN PATENT DOCUMENTS

| | | | |
|---|---|---|---|
| 3-97114 | 4/1991 | Japan | 360/106 |
| 2212971 | 8/1989 | United Kingdom | 360/106 |
| 2214343 | 8/1989 | United Kingdom | 360/106 |

*Primary Examiner*—Stuart S. Levy
*Assistant Examiner*—Kevin M. Watkins
*Attorney, Agent, or Firm*—Brian J. Wieghaus

[57] ABSTRACT

A magnetic-tape apparatus having a magnetic-head unit includes a head support which is rotatably mounted by a mounting device and has a duct through which a flexible conductor board is passed, which conductor board for connection to a signal processing circuit comprises a widened connecting portion. The head support has at least one slot which extends at least over the entire length of the duct, passes through the head support and terminates in the duct, through which slot the flexible conductor board can be passed while its original flat shape is maintained.

11 Claims, 4 Drawing Sheets

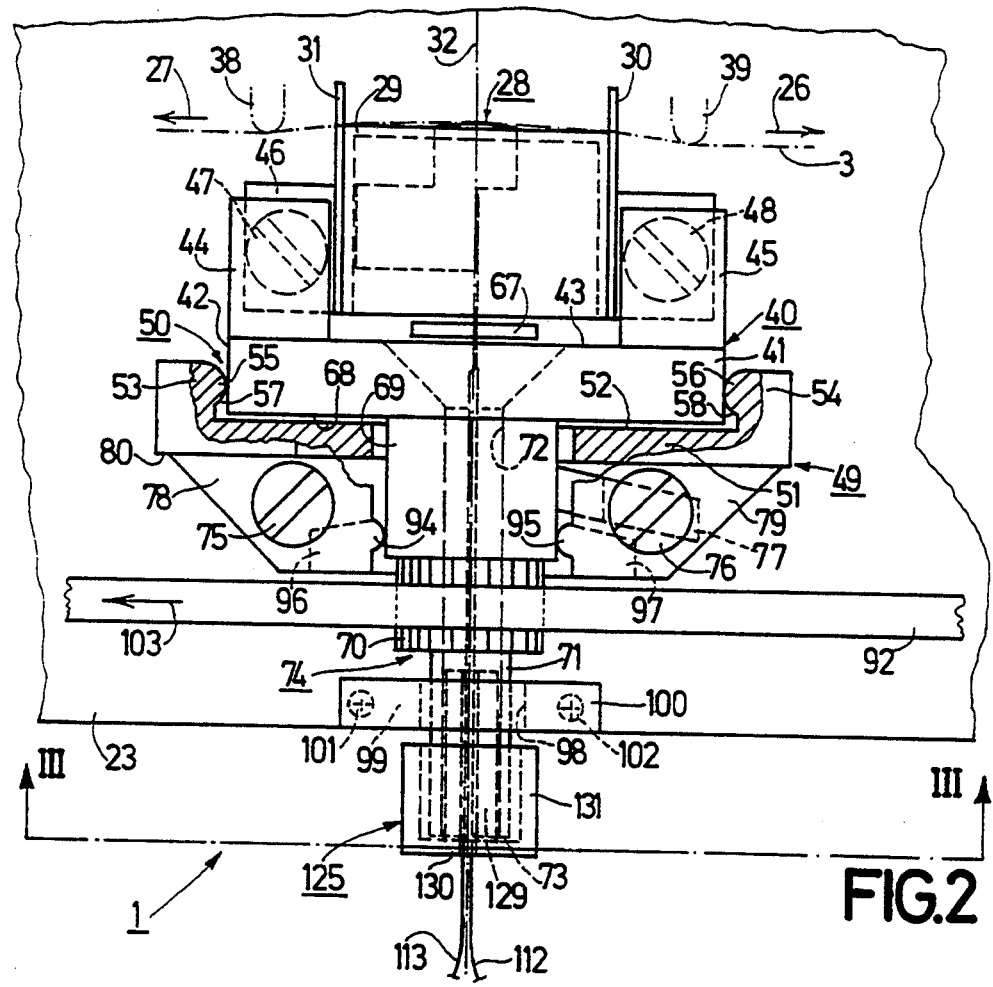
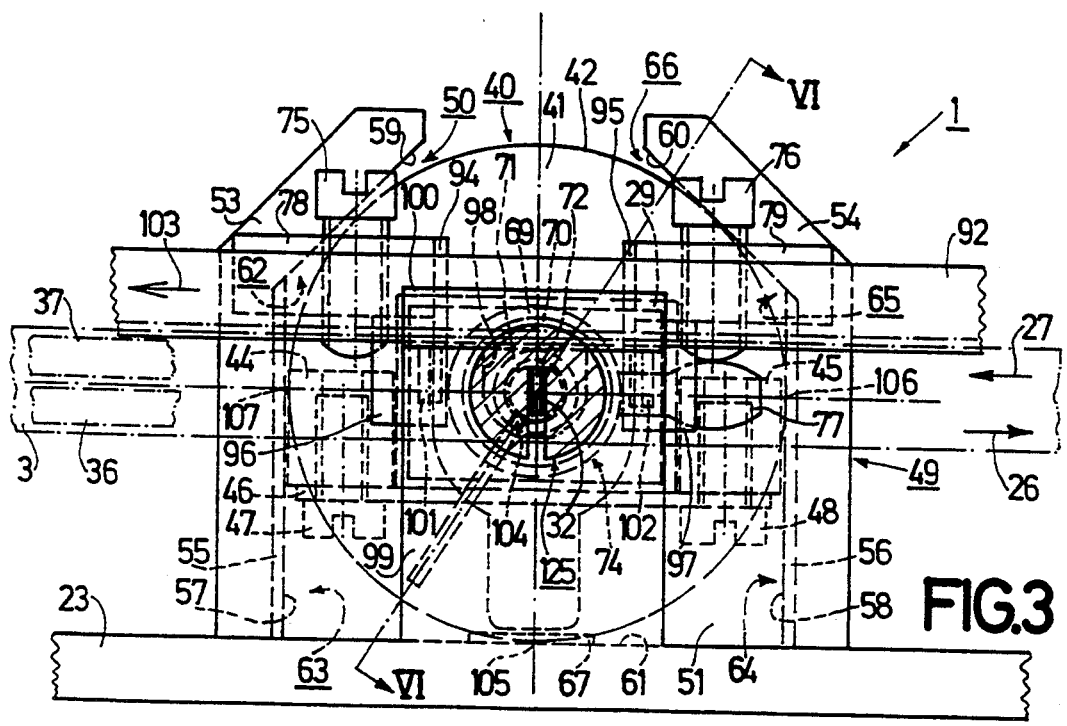
FIG.2
FIG.3

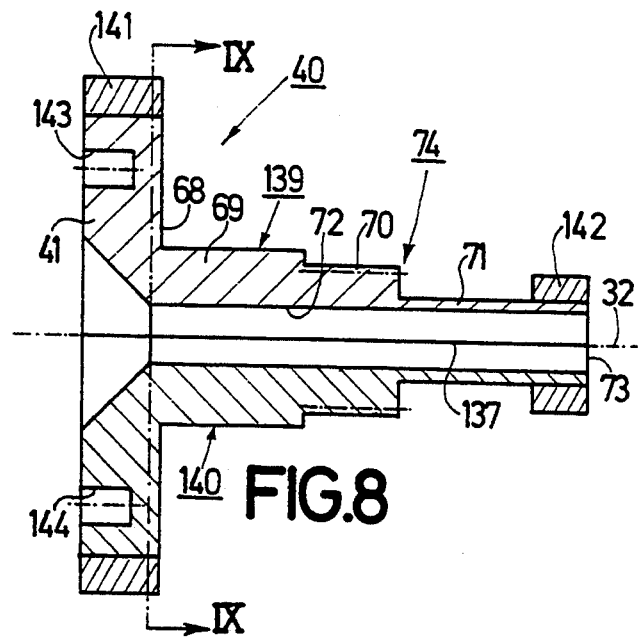
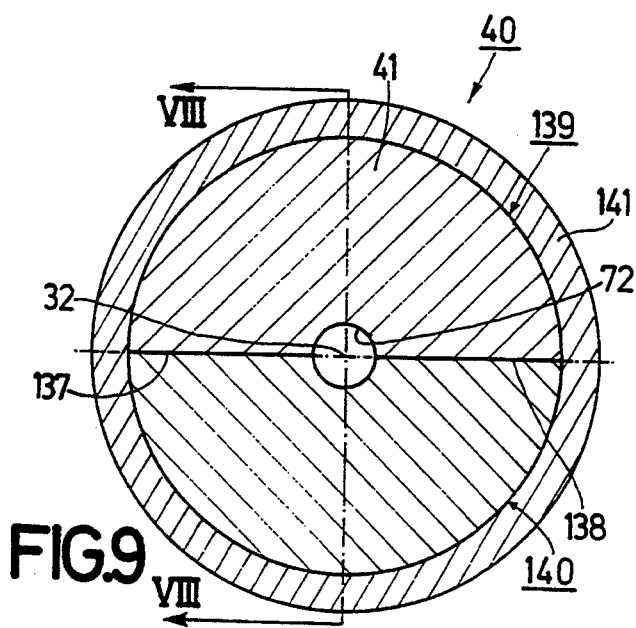

AUTO-REVERSE MAGNETIC-HEAD UNIT HAVING A FLEXIBLE CONDUCTOR BOARD

BACKGROUND OF THE INVENTION

The invention relates to a magnetic-tape apparatus comprising a magnetic-head unit for scanning a magnetic tape, which unit is pivotable through 180° between two scanning positions about a pivotal axis substantially perpendicular to the magnetic tape being scanned and which is carried by a head support which is rotatably mounted by means of a mounting device and which is rotatable about the pivotal axis, which head support has a duct leading to the magnetic-head unit carried by the head support and to the end of the head support which is remote from the magnetic-head unit, which duct is traversed by at least a flexible conductor board having conductor tracks connected to the magnetic-head unit and also leading to a signal processing circuit of the apparatus, which board at its end leading to the signal processing circuit comprises a connecting portion which is widened relative to the section situated in the duct.

A magnetic-tape apparatus of the type defined in the opening paragraph is known and is commercially available. In the known apparatus, the flexible conductor board comprises only six adjacent conductor tracks for electrically connecting the magnetic-head unit to the signal-processing circuit. Owing to the comparatively small number of conductor tracks these tracks can be comparatively wide, so that mechanically the conductor tracks are comparatively robust. In the area adjacent the magnetic-head unit and extending through the duct the flexible conductor board is divided into two conductor board strips by a dividing zone which extends in the same direction as the duct and whose width is slightly smaller than the diameter of the duct, which is of circular cross-section in this case. This ensures that the two conductor board strips in the duct always have a flat shape, so that the conductor board strips and the conductor tracks provided on these strips are not mechanically loaded. To pass the flexible conductor board through the duct of the head support, which is necessary during manufacture of the apparatus, there are two possibilities. With the first possibility the conductor tracks of the conductor board are first electrically connected to the magnetic-head unit, which means that subsequently the widened connecting portion of the flexible conductor board has to be passed through the duct. For this purpose the widened connecting portion should be rolled up about a rolling axis extending in the longitudinal direction of the duct and should be pushed through the duct in its rolled-up condition. Both as a result of rolling-up and pushing through of the connecting portion it is not unlikely, despite the comparatively small number of conductor tracks and the resulting comparatively high mechanical strength of the conductor tracks of the flexible conductor board, that the mechanical loading gives rise to damaging of the conductor tracks at the location of the connecting portion, which may lead to interruptions in the conductor tracks. In such cases the entire magnetic-head unit is unserviceable and has to be removed, which is inconvenient and undesirable. With the second possibility the two narrow conductor board strips are passed through the duct and subsequently the conductor tracks of the conductor board are electrically connected to the magnetic-head unit. However, this is undesirable and problematic in view of a reliable, simple and automated electrical connection of the conductor tracks of the flexible conductor board to the magnetic-head unit or to the corresponding connections of the magnetic-head unit.

SUMMARY OF THE INVENTION

It is an object of the invention to preclude the above problems and to construct a magnetic-tape apparatus of the type defined in the opening paragraph in an advantageous manner such that before they are passed through the head support the conductor tracks of the flexible conductor board are electrically connected to the magnetic-head unit and that subsequently the flexible conductor board can be passed through the head support without the risk of damaging of the conductor tracks of the conductor board, even if the conductor board comprises a large number of conductor tracks.

To this end the invention is characterised in that the head support has at least one slot which extends at least over the entire length of the duct, extends through the head support and terminates in the duct, said slot being constructed in such a manner that the flexible conductor board can be passed through the slot while its flat shape is maintained. In a very simple manner it is thus achieved that the entire flexible conductor board and, consequently, also the widened connecting portion of the flexible conductor board can be passed through the head support while its original flat shape is maintained, so that the conductor tracks are not mechanically loaded when the flexible conductor board is passed through and interruption of the conductor tracks is substantially excluded.

The head support may have two slots which are opposed diametrically relative to the pivotal axis and which each extend over the entire dimension of the head support in the direction of the pivotal axis, and consequently comprises two parts which are joined after introduction of the flexible conductor board into the duct and which are held together by separate connection means. Such a construction has the advantage that the flexible conductor board can be passed very simply through the head support but in order to achieve a sufficiently high mechanical stability of the two-part head support additional separate means are needed which make the head support and hence the magnetic-tape apparatus more complicated and expensive. In a magnetic-tape apparatus in accordance with the invention, in which the head support comprises a tubular supporting member which is coaxial with the pivotal axis and which at its end which faces the magnetic-head unit changes into a holding member having a larger radial dimension than the tubular supporting member, it is found to be advantageous if the slot comprises a first slot portion, which traverses the wall of the tubular supporting member over its entire length and extends in the direction of the pivotal axis, and a second slot portion, which partly passes through the holding member, is inclined relative to the first slot portion and terminates in the first slot portion. In this way it is achieved that the head support can consist of a single part, which has the advantage of a high mechanical stability of the head support and enables it to be manufactured cheaply using plastics technology, which has the advantage of lower production costs, and that in addition to these advantages the flexible conductor board can be passed simply through the head support.

With such a magnetic-tape apparatus it is found to be very advantageous if there is provided an end member mounted on the tubular supporting member of the head support, which end member has a passage for the flexible conductor board, which passage extends in the direction of the pivotal axis, and a slot which extends radially of the pivotal axis from the outer surface of the end member up to its passage, through which slot the flexible conductor board can be introduced into the passage, by means of which end member the first slot portion of the slot in the tubular supporting member can be closed at least partly. In this way the flexible conductor board is very effectively prevented from sliding out of the duct of the head support by simple means.

With such a magnetic-tape apparatus it is found to be very advantageous if the end member comprises a rib which extends radially of the pivotal axis and from the duct of the head support into the first slot portion of the slot, which slot portion extends through the wall of the tubular supporting member, which rib has a rounded free end by which the circumferential surface of the tubular supporting member is completed to a circularly cylindrical surface at the location of the first slot portion. In this way it is achieved that, despite the presence of the slot in the tubular supporting member, the circumferential surface of this tubular supporting member, at least at the location of the rib, is a substantially continuous circularly cylindrical surface, which cooperates with a bore to guarantee a correctly supported head support.

It is also found to be advantageous if the end member comprises two mutually parallel guide surfaces for the flexible conductor board, between which guide surfaces the conductor board is passed with clearance. This ensures that the entire part of the flexible conductor plate which traverses the head support is not twisted when the magnetic-head unit is pivoted.

BRIEF DESCRIPTION OF THE DRAWINGS

The invention will now be described in more detail on the basis of two exemplary embodiments which are shown in the drawings but to which the invention is not limited.

FIG. 2 is an enlarged-scale plan view of a part of the apparatus shown in FIG. 1, comprising the pivotable magnetic-head unit supported by the rotatable head support, which is rotatably mounted by means of a mounting device of the apparatus.

FIG. 3 shows the same part as FIG. 2 in a sectional view taken on the line III—III in FIG. 2.

FIG. 8, in the same way as FIG. 6, shows a head support of a magnetic-tape apparatus in a second embodiment of the invention.

FIG. 9 shows the head support in a sectional view taken on the line IX—IX in FIG. 8.

DESCRIPTION OF THE PREFERRED EMBODIMENT

Figure 1:
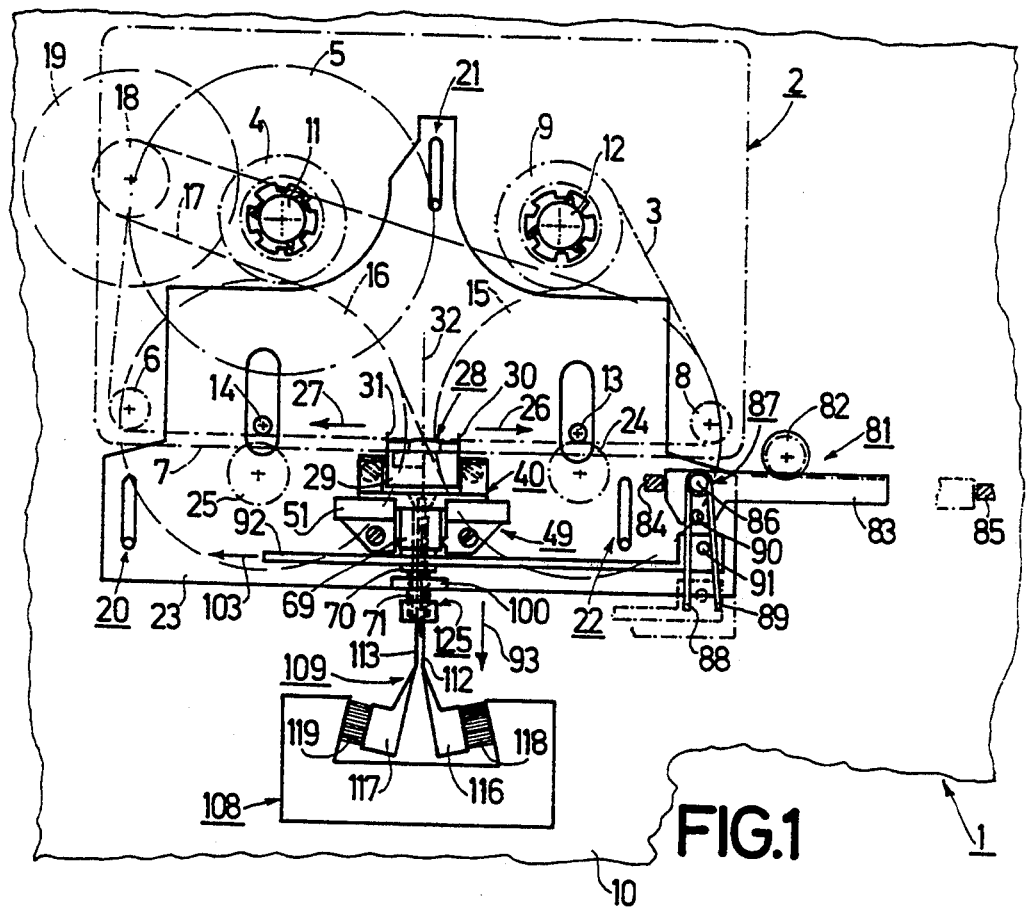
FIG. 1 is a diagrammatic plan view showing a relevant part of a magnetic-tape apparatus by means of which a magnetic tape which can be driven in opposite directions of tape transport can be scanned and which for scanning the magnetic tape comprises a magnetic-head unit for recording and reproduction, which unit is arranged on a rotatable head support and is pivotable through 180° between two scanning positions, the unit being connected to a signal processing circuit by means of a flexible conductor board passed through a duct in the head support.

FIG. 1 shows a part of a magnetic-tape apparatus 1 constructed to receive a cassette 2, which is shown diagrammatically in dash-dot lines in FIG. 1. For this purpose the apparatus 1 has, for example, a trough-shaped cassette holder, not shown. The cassette 2 accommodates a magnetic tape 3. The magnetic tape 3 extends from a first reel hub 4, on which the magnetic tape 3 has been wound to form a tape spool 5 in the situation shown, to a second reel hub 9 via a tape guide 6, along a long narrow side 7 of the cassette and via a further tape guide 8, and can thus be wound between the two reel hubs 4 and 9.

The magnetic-tape apparatus 1 comprises a substantially plate-shaped chassis 10. A first rotatably drivable winding mandrel 11 and a second rotatably drivable winding mandrel 12 are rotatably supported on the chassis 10 to rotate the first reel hub 4 and the second reel hub 9 respectively. A first capstan 13 and a second capstan 14 are also rotatably supported on the chassis 10. Each of the two capstans 13 and 14 is rotationally locked to one of two flywheels 15 and 16. A belt 17, which is guided on a pulley 18, is wrapped oppositely around part of the circumferential surfaces of the two flywheels 15 and 16. The pulley 18 can be driven with a constant speed by a motor 19 secured to the chassis 10 in an anticlockwise direction as viewed in FIG. 1. The second winding mandrel 12 can be driven by the first capstan 13 and the first winding mandrel can be driven by the second capstan 14 in known manner by means of a selectively activated intermediate drive mechanism, which comprises for example a plurality of drive wheels and a friction coupling to compensate for differences in speed.

The apparatus 1 further comprises a mounting plate 23 which is guided on the chassis 10 by means of three pin-slot joints 20, 21 and 22 so as to be movable perpendicularly to the long narrow side 7 of the cassette. Such a mounting plate is often also referred to as a head support. The mounting plate 23 carries a first pressure roller 24 and a second pressure roller 25, which are pivotably supported on the mounting plate 23 by means of levers, not shown, and which can be applied selectively in resilient engagement with one of the two capstans 13 and 14, the magnetic tape 3 being situated between the relevant capstan and the relevant pressure roller. In this way the magnetic tape 3 can be driven with a constant tape speed by means of a rotatably driven capstan against which the magnetic tape is pressed by the associated pressure roller. In a "normal forward" mode the first pressure roller 24 is pressed against the first capstan 13, as is shown in FIG. 1. The motor 19 then drives the first capstan 13 with a constant speed in the anti-clockwise direction viewed in FIG. 1, so that the magnetic tape 3 is driven in the tape transport direction indicated by an arrow 26. The magnetic tape 3 is then wound onto the second reel hub 9, which is driven by the second winding mandrel 12. In a "normal reverse" mode, also referred to as "reverse" mode the second pressure roller 25 is pressed against the second capstan 14, the motor 19 driving the second capstan 14 in the clockwise direction viewed in FIG. 1, so that the magnetic tape 3 is driven in the tape transport direction indicated by an arrow 27. The magnetic tape 3 is then wound onto the first reel hub 4 driven by the first capstan 11.

The mounting plate 23 of the magnetic-tape apparatus 1 further carries a magnetic-head unit 28 for recording and reproducing information signals, for example audio signals. The magnetic-head unit 28 is mounted in a metal housing 29 in a manner not shown, which housing comprises a fork-shaped tape guide 30 and 31 situated at opposite sides of the magnetic-head unit 28. The magnetic-head unit 28 is pivotable through 180° between two scanning positions about a pivotal axis 32 which extends perpendicularly to the long narrow side 7 of the cassette and perpendicularly to the magnetic tape 3 being scanned, one of said scanning positions being shown in FIGS. 1 to 4. Each scanning position corresponds to one of the two opposite tape-transport directions 26 and 27. In each scanning position the magnetic-head unit 28 scans a track area of the magnetic tape 3 by means of magnet-core systems 33, 34 and 35, shown diagrammatically in FIG. 4, which are disposed eccentrically of the pivotal axis 32 of the magnetic-head unit 28. The magnet-core systems 33 comprise two magnet cores which are juxtaposed in the track-width direction and which are constructed for the reproduction of stereophonically recorded audio signals in analog form. The magnet-core system 34 comprises nine magnetic cores which are juxtaposed in the track-width direction and which are constructed for recording audio signals in digital form. The magnet-core system 35 also comprises nine magnetic cores which are juxtaposed in the track-width direction and which are constructed for the reproduction of audio signals in digital form.

Figure 4:
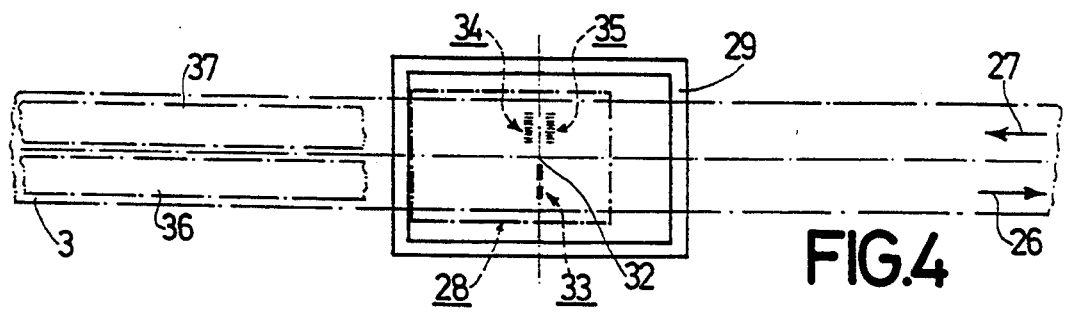
FIG. 4, in the same way as FIG. 3, shows the magnetic-head unit shown in FIGS. 1 to 3 together with the magnetic tape scanned by the magnetic-head unit.

In FIGS. 3 and 4, the two track areas of the magnetic tape 3 bear the reference numerals 36 and 37. In the situation shown in FIGS. 2 and 3, the magnetic tape 3 is driven in the tape-transport direction 26 and the magnetic-head unit 28 consequently occupies the scanning position in which it scans the track area 36 by means of its magnet-core system 33 and the track area 37 by means of its two magnet-core systems 34 and 35. When the magnetic tape 3 is driven in the opposite tape-transport direction 27 the magnetic-head unit 28 occupies the reversed other scanning position in which it scans the track area 37 by means of its magnet-core system 33 and the track area 36 by means of its two magnet-core systems 34 and 35. FIG. 2 shows two tape guides 38 and 39 at the cassette side in dash-dot lines, which tape guides provide the necessary contact of the magnetic tape 3 with the magnetic-head unit 28.

The magnetic-head unit 28 is carded by a head support 40 which is pivotable about the pivotal axis 32. To hold the magnetic-head unit 28 the head support 40 comprises a holding member in the form of a cylindrical supporting disc 41 having an outer cylindrical surface 42. Two block-shaped projections 44 and 45, which are integral with the supporting disc 41, project from a radial surface 43 of the disc 41 in the direction of the pivotal axis 32. A plate 46 is secured to these two projections 44 and 45 by means of two screws 47 and 48. The housing 29 of the magnetic-head unit 28 is connected to the plate 46.

On the mounting plate 23 the magnetic-tape apparatus 1 has a mounting device 49 with a mounting recess 50 for rotatably mounting the head support 40. The mounting device 49 is partly constituted by the mounting plate 23 itself and by a substantially disc-shaped bearing member 51. At the location of its radial surface 52 facing the magnetic-head unit 28 the bearing member 51 has two ridges 53 and 54 which are mirror-inverted relative to one another and which have end portions which are inclined towards one another at their ends which are remote from the mounting plate 23. The portions of the two ridges 53 and 54 which extend perpendicularly to the mounting plate 23 each comprise a straight bead 55 and 56, respectively, of substantially semicircular cross-section whose semicircular bounding walls 57 and 58, which extend perpendicularly to the two tape-transport directions 26 and 27, bound the mounting recess 50 in which the supporting disc 41 is rotatably mounted. Two further bounding walls 59 and 60 of the mounting recess 50 are defined by the inclined end portions of the ridges 53 and 54. A further bounding wall 61 of the mounting recess 50 is formed by a part of the wall of mounting plate 23 which faces the magnetic-head unit 28. This bounding wall 61 of the mounting recess 50 extends in the same direction as the two tape-transport directions 26 and 27. With its supporting disc 41 the head support 40 is rotatable with clearance in the mounting recess 50 bounded by said bounding walls 57, 58, 59, 60 and 61. In practice this clearance is approximately one tenth of a millimeter. As can be seen in FIG. 3, the mounting recess 50 of the mounting device 49 has areas 62, 63, 64, 65 and 66 where the supporting disc 41 of the head support 40 is free, so that in a cross-sectional view of the mounting recess 50 the supporting disc 41 of the head support 40 is only in point contact with the mounting recess at predetermined contact points, as will be explained hereinafter. In order to limit axial movement of the head support 40 its supporting disc 41 cooperates with a rib 67 which projects from the mounting plate 23, via which rib the supporting disc 41 is pressed in the direction of the pivotal axis 32 when the head support 40 is inserted into the mounting device 49.

At the radial surface 68 of the supporting disc 41 which is remote from the magnetic-head unit 28 the head support 40 comprises a first positioning cylinder 69 which is coaxial and integral with said disc. A toothed wheel 70 is coaxial and integral with said first positioning cylinder 69. A second positioning cylinder 71 of smaller diameter is coaxial and integral with the toothed wheel 70. A bore 72 extends through the supporting disc 41, the first positioning cylinder 69, the toothed wheel 70 and the second positioning cylinder 71, and in the supporting disc 41 it flares towards the magnetic-head unit 28. The bore 72 forms a duct leading to the magnetic-head unit 28 and to the end 73 of the head support 40 which is remote from the magnetic-head unit 28, electrical leads to the magnetic-head unit 28 being passed through the bore, as will be described in more detail hereinafter. The first positioning cylinder 69, the toothed wheel 70 and the second positioning cylinder 71, which are all traversed by the bore 72, together constitute a tubular supporting member 74 which, in addition to the supporting disc 41, has been provided for rotatably mounting the head support 40.

As mentioned hereinbefore, the magnetic-head unit 28 is pivotable through 180° between two scanning positions. Consequently, the head support 40 is also rotatable through 180° between two operating positions. These two operating positions are defined by means of two adjustable positioning screws 75 and 76, whose free ends depending on the operating position of the head support 40 engage with a positioning projection 77 which projects radially from the first positioning cylinder 77, as is shown in FIGS. 2 and 3 for the operating position of the head support 40 which corresponds to the "normal forward" mode. The positioning screws 75 and 76 are each fitted in a plate-shaped projection 78 and 79 of the bearing member 51. The two projections 78 and 79 of the bearing member 51 project from the radial surface 80 which is remote from the magnetic-head unit 28 towards the pivotal axis 32.

In order to reverse the magnetic-head unit 28 and the head support 40 the apparatus comprises an actuating device 81 for the head support 40, which device is shown in FIG. 1. The actuating device 81 comprises a toothed wheel 82 which can be driven in opposite directions of rotation by means of a motor, in a manner not shown. The toothed wheel 82 meshes with a toothed rack 83 which is guided to be movable in its axial direction between two stops 84 and 85, shown diagrammatically. A leg spring 87 is fitted around a pin 86 projecting from the toothed rack 83 and has two legs 88 and 89 between which a pin 90 projecting from the rack 83 extends, thereby defining the position of the leg spring 87. The two legs 88 and 89 of the leg spring 87 tend to move towards one another. A further pin 91 extends between the two legs 88 and 89 of the leg spring 87 and is connected to a toothed rack 92 which is guided on the mounting plate 23 so as to be movable in its longitudinal direction. The toothed rack 92 is in mesh with the toothed wheel 70 of the head support 40.

In a known manner, reversal of the magnetic-head unit 28 is possible only if the magnetic-head unit 28 has been moved so far out of the scanning position shown in FIG. 1 in the direction indicated by the arrow 93 that it has been withdrawn from the cassette 2. This movement of the magnetic-head unit 28 is obtained by moving the mounting plate 23 in the direction indicated by the arrow 93, as is shown in dash-dot lines in FIG. 1 for a part of the mounting plate 23 and the end of the toothed rack 92 carrying the pin 91. As is illustrated by the dash-dot lines, the pin 91 is also situated between the two legs 88 and 89 of the leg spring 87 when the mounting plate 23 has been moved, thereby guaranteeing that in this position of the mounting plate 23 force is transmitted from the motor-driven toothed wheel 82 and the toothed rack 83 to the pin 91 via the leg spring 87 and consequently to the toothed rack 92, the toothed wheel 70 and the head support 40. Therefore, before the magnetic-head unit 28 is reversed, the mounting plate 23 is moved in the direction indicated by the arrow 93 and after the reversal of the magnetic-head unit 28 the mounting plate 23 is moved back in a direction opposite to that indicated by the arrow 93. How this movement of the mounting plate 23 is effected is not relevant to the present invention and is therefore not indicated.

For additionally positioning the head support 40 in its two operating positions this support is integral with the first coaxial positioning cylinder 69 and the second coaxial positioning cylinder 71. For the cooperation with the first positioning cylinder 69 there are provided two positioning ribs 94 and 95 which have substantially semicircular cross-section shapes and extend perpendicularly to the two tape-transport directions 26 and 27. The two positioning ribs 94 and 95 are each arranged on one of two blocks 96 and 97 which project from the plate-shaped projections 78 and 79 of the bearing member 51 towards the mounting plate 23. The second coaxial positioning cylinder 71 extends through an opening 98 in a positioning plate 99 which projects perpendicularly from the mounting plate 23. At its end which is remote from the mounting plate 23 the opening 98 in the positioning plate 99 is closed by a member 100 which is secured to the positioning plate 99 by two laterally projecting pins 101 and 102 pressed into corresponding bores in the positioning plate 99.

The reversal of the magnetic-head unit 28 is described below. It is assumed that the magnetic-head unit 28 is in the scanning position not shown in FIGS. 1 to 3, in which the magnet-core system scans the track area 37 and the two magnet-core systems 34 and 35 scan the track area 36, the toothed rack 83 then being in the position indicated by the dash-dot line shown in FIG. 1, in which it abuts against the stop 85. The mounting plate 23 is first moved in the direction indicated by the arrow 93, so that the magnetic-head unit 28 is withdrawn from the cassette 2. Subsequently, the toothed wheel 82 is driven clockwise in FIG. 1, causing the toothed rack 83 to be moved into its position shown in solid lines in FIG. 1, in which position it abuts against the stop 84. The pin 91 is then moved by means of the leg spring 87 via its leg 89, causing the leg spring 87 to be tensioned and the toothed rack 92 to be moved in the direction indicated by the arrow 103. As a result of this, the toothed wheel 70 is rotated anti-clockwise as viewed in FIG. 3. In this way the head support 40 is also rotated anti-clockwise until the positioning projection 77 abuts against the free end of the positioning screw 76. When this is the case the head support 40 has reached its operating position in which the magnetic-head unit 28 occupies the scanning position in which it can scan the track area 36 by means of its magnet-core system 33 and the track area 37 by means of its two magnet-core systems 34 and 35. Subsequently, the mounting plate 23 is moved back in a direction opposite to that indicated by the arrow 93, the magnetic-head unit 28 again being applied to the cassette 2 to scan the magnetic tape 3. This operating position is illustrated in FIGS. 1 to 4.

In the operating position illustrated in FIGS. 1 to 4 the leg 89 of the leg spring 87, which acts upon the toothed rack 83, continually exerts a force on the toothed rack 92 via the pin 91, as a result of which the toothed rack 92 is urged in the direction indicated by the arrow 103. Thus, the leg spring 97 forms a loading means which in the present operating position of the head support 40 continually urges the toothed rack 92 in the direction indicated by the arrow 103. As a result of this load exerted by the leg spring 87, the toothed rack 92 continually exerts a force on the toothed wheel 70. This force causes the positioning projection 77 to be pressed against the free end of the positioning screw 76. Moreover, this force presses the first positioning cylinder 69 against the positioning rib 94 on the block 96. Said force also presses the second positioning cylinder 71 against that bounding wall 104 of the opening 98 in the positioning plate 99, which wall faces the mounting plate 23. Since the positioning projection 77 is pressed against the free end of the positioning screw 76 by means of the toothed rack 92 a torque acting on the head support 40 is produced and presses the supporting disc 41 of the head support 40 with its surface 42 against the bounding wall 61 of the mounting recess 50 formed in the mounting plate 23, the supporting disc 41 of the head support 40 and the bounding wall 61 of the mounting recess 50 of the mounting device 49 being in engagement with one another at a contact area 105 which is point-shaped in a cross-sectional view of the mounting recess 50. Since the first positioning cylinder 69 is pressed against the positioning rib 94 on the block 96 by means of the toothed rack 92 a further torque acting on the head support 40 is produced and presses the supporting disc 41 of the head support 40 with its surface 42 against the bounding wall 58 of the bead 56, the supporting disc 41 of the head support 40 and the bounding wall 58 of the bead 56 being in engagement with one another at a contact area 106 which is also point-shaped in a cross-sectional view of the mounting recess 50.

The operating position of the head support is thus defined exactly in the manner described above. In this operating position the surface 42 of the supporting disc 41 of the head support 40 is pressed only against the two above-mentioned contact areas 105 and 106. Since the head support 40 is in engagement with the cross-sectionally point-shaped bearing areas 105 and 106 each time that it is rotated into this operating position it is guaranteed that the head support 40 always assumes the operating position defined by the two contact areas 105 and 106 in an unambiguously reproducible manner. Thus, it is achieved that the magnetic-head unit 28 carried by the head support 40 is always set to the same scanning position in an unambiguously reproducible manner, thereby guaranteeing that a correct scanning performance of the magnetic-head unit 28 is maintained.

As can be seen in FIGS. 2 and 4 the magnetic tape 3 moves past the magnetic-head unit 28 in the tape-transport direction 26 in the shown operating position of the head support 40. The magnetic tape 3 then exerts a frictional force on the magnetic-head unit 28. This frictional force extends in the tape-transport direction 26 and, via the magnetic-head unit 28, it produces a torque which acts upon the head support 40 and which assists the leg spring 87 in pressing the supporting disc 41 of the head support 40 against the contact area 106 in the mounting recess 50. This ensures that even if a large frictional force is exerted on the magnetic-head unit 28 this unit 28 remains in its scanning position.

In the operating position of the head support 40 which is reversed relative to that described above and which is not shown in FIGS. 1 to 4, the leg spring 87 forming the loading means always subjects the toothed rack 92 to a force opposite to the direction indicated by the arrow 103. As a result of this, the toothed rack 70 always exerts a force on the toothed wheel 70 of the head support 40, by which the positioning projection 77 is pressed against the free end of the other positioning screw 75, the first positioning cylinder 69 is pressed against the other positioning rib 95 on the block 97, and the second positioning cylinder 71 is pressed against the bounding wall 104 of the opening 98 in the positioning plate 99. Moreover, the supporting disc 41 of the head support 40 is then pressed against the bounding wall bounding wall 61 of the mounting recess 50 and against the bounding wall 57 of the other bead 55 in the mounting recess 50, the supporting disc 41 of the head support 40 again being in engagement only with two predetermined cross-sectionally point-shaped contact areas on the mounting device 49, i.e. at the contact area 105 and at a further contact area 107 on the bounding wall 57 of the bead 55, so that also in this operating position of the head support 40 the magnetic-head unit 28 always occupies the same scanning position, thereby guaranteeing a correct scanning by the magnetic-head unit 28.

Figure 5:
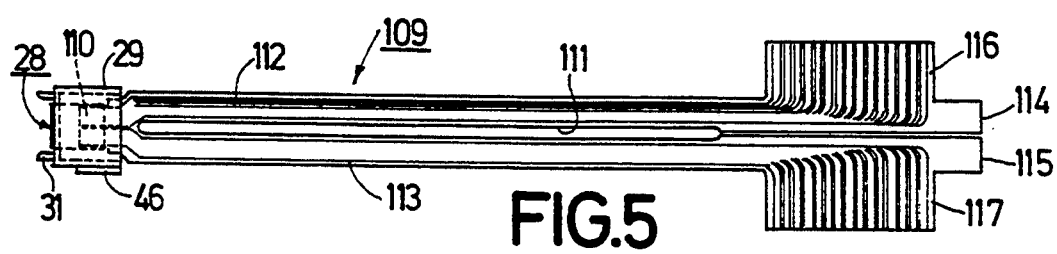
FIG. 5 shows the magnetic-head unit shown in FIGS. 1 to 3 together with the flexible conductor board connected to the magnetic-head unit, enlarged about 1.5 times relative to full scale.

As already stated, the magnetic-head unit 28 has three magnet-core systems 33, 34 and 35, which serve for scanning two track areas 36 and 37. The electrical coils of these magnet-core systems 33, 34 and 35 are connected to a signal processing circuit 108, shown diagrammatically in FIG. 1, via electrical leads. The electrical leads are constituted by a flexible conductor board 109, which is shown diagrammatically in FIGS. 1 to 3 and realistically in FIG. 5. As can be seen in FIG. 5 the flexible conductor board 109 comprises a connecting portion 110 connected to the magnetic-head unit 28. Adjacent this connecting portion 110 a dividing zone 111 divides the flexible conductor board in its longitudinal direction into two conductor board sections 112 and 113. The width of these conductor board sections 112 and 113 is slightly smaller than the diameter of the bore 72 through the tubular supporting member 74 of the head support 40. At the ends 114 and 115 of its two conductor board sections 112 and 113 leading to the signal processing circuit 108 the flexible conductor board 109 has connecting portions 116 and 117 which are widened in comparison with the conductor board sections 112 and 113 which are disposed in the duct 72 in the assembled condition. In the two connecting portions 116 and 117 the conductor tracks have a larger width than in the two conductor board sections 112 and 113. This larger width of the conductor tracks is necessary because the widened connecting portions 116 and 117 are adapted to cooperate with so-called printed-circuit connectors via which the electrical connection between the conductor tracks of the flexible conductor board 109 and the signal processing circuit 108 is made. In order to guarantee a correct insertion of the widened connecting portions 116 and 117 into the printed-circuit connectors 118 and 119 shown diagrammatically in FIG. 1, the widened connecting portions 116 and 117 are additionally stiffened so that they can bend only to a very limited extent. Each of the two connecting portions 116 and 117 and each conductor board section 112 and 113 connected to the respective connecting portion comprises fifteen conductor tracks.

During assembly of the magnetic-tape apparatus 1 the flexible conductor board 109, which is connected directly to the magnetic-head unit 28 in the housing 29 by means of its connecting portion 110, must be passed through the head support 40. For this purpose, the head support 40 has a slot 120 which extends over the full length of the duct 72 and which passes through the head support 40 radially of the pivotal axis 32 and terminates in the duct 72, the slot being constructed in such way that the flexible conductor board 109 can be passed through the slot 120 while maintaining its flat shape.

Figure 6:
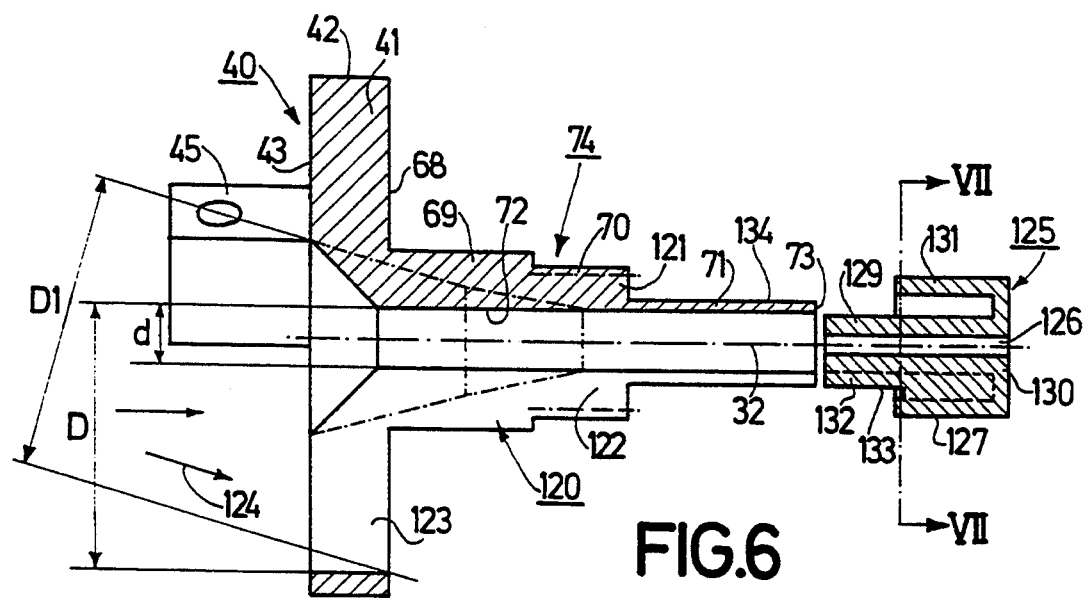
FIG. 6 is a sectional view taken on the line VI—VI in FIG. 3 and to the same scale as FIGS. 2 and 3, showing the head support of the apparatus in FIGS. 1 to 3 and a closing member for closing a tubular supporting member of the head support.

As can be seen in FIG. 6, the slot 120 comprises a first slot portion 122, which traverses the wall 121 of the tubular supporting member 74 over its entire length and extends in the direction of the pivotal axis 32, and a second slot portion 123, which partly passes through the supporting disc 41 forming the holding member for holding the magnetic-head unit 128, which second slot portion 123 is inclined relative to the first slot portion 122 and terminates in the first slot portion 122.

As can also be seen in FIG. 6, the duct 72 in the form of a bore has a diameter d. Without special steps each of the two widened connecting portions 116 and 117 of the flexible conductor board 109 would have to be rolled up to allow the passage of the flexible conductor board 109 through this duct 72, which is not practical because the connecting portions 116 and 117 have been stiffened and this would lead to breaking of the conductor tracks. By providing the slot 120 of a construction as shown in solid lines in FIG. 6, a flexible conductor board whose width is slightly smaller than the radial dimension D of the slot 120, which dimension D is substantially larger than the diameter d of the duct 72, can be passed through this slot 120 in the direction of the pivotal axis 32 without having to change the original flat shape of the flexible conductor board. In the present embodiment, in which the flexible conductor board 109 has two conductor board sections 112 and 113 which each change into a widened connecting portion 116 and 117 respectively, the sections 112, 113 and the connecting portions 116, 117 are arranged with their main surfaces adjacent each other, after which they are passed through the slot 120.

In FIG. 6 a duct of a second construction is shown in dash-dot lines, the duct comprising two tapered parts in its area facing the magnetic-head unit. This construction of the duct enables an even wider flexible conductor board, whose width corresponds substantially to the value D1, to be passed through the slot 120 in the direction indicated by the arrow 124.

By providing the slot 120 it is achieved in a very simple manner that the entire flexible conductor board 109 and consequently also the widened connecting portions 116 and 117 of the flexible conductor board 109 can be passed through the head support 40 with their original flat shape, so that when the flexible conductor board 109 is passed through the conductor tracks on this board 109 are not subjected to any mechanical loads and consequently damaging of these conductor tracks or an interruption of these conductor tracks is excluded. Moreover, this yields the advantage that the flexible conductor board 109 can already be connected to the magnetic-head unit 28 with its connecting portion 110 before it is passed through the head support 40. This is very advantageous because in the present case, in which the connecting potion 110 has thirty conductor tracks in total, these tracks are very narrow, which narrow conductor tracks can only be connected to the corresponding terminals of the magnetic-head unit by a very expensive and intricate method, which requires the use of a separate device by means of which the flexible conductor board is also connected to the magnetic-head unit in the course of the production of the entire magnetic-head unit.

As is apparent from FIGS. 1, 2, 3 and 6, the magnetic tape apparatus 1 comprises an end member 125 mounted on the tubular supporting member 74 of the head support 40. As is shown in particular in FIG. 7, the end member 125 has a passage 126 for the flexible conductor board 109, i.e. for the two sections 112 and 113 of the flexible conductor board 109, which passage extends in the direction of the pivotal axis 32. The end member 125 further has a slot 128 which extends radially of the axis 32 from the outer surface 127 of the end member 125 up to its passage 126. The flexible conductor board 109, i.e. its conductor board sections 112 and 113, can be passed through the slot 128 into the passage 126 of the end member 125. During assembly of the apparatus 1 the flexible conductor board 109 is first passed through the slot 120 in the head support 40, after which the conductor board sections 112 and 113 are situated in the bore 72 of the supporting member 74. Subsequently, the end member 125 is slid onto the conductor board sections 112 and 113 with its slot 128 until the conductor board sections 112 and 113 are situated in the passage 126. After this the end member 125 is slid in the direction of the pivotal axis 32 onto the tubular supporting member 74, i.e. onto the second positioning cylinder 71 thereof. For this purpose, the end member 125 comprises a substantially cylindrical portion 129, which is inserted into the bore 72 in the second positioning cylinder 71. The passage 126 of the end member 125 is situated in this cylindrical portion 129. The cylindrical portion 129 of the end member 125 is integrally connected to a hollow cylindrical portion of the end member 125 via a disc-shaped portion 130 of the end member 125. By means of this end member 125 the first slot portion 122 of the slot 120, formed in the tubular supporting member 74 of the head support 40, can be closed partly, which ensures that the conductor board sections 112 and 113 cannot inadvertently slide out of the duct 72.

The end member 125 further comprises a rib 132 which extends radially of the pivotal axis 32. The rib 132 extends from the duct 72 in the head support 40 into the first slot portion 122 of the slot 120 which extends through the wall 121 of the tubular supporting member 74. The rib 132 has a rounded free end 133 by which the circumferential surface 134 of the tubular supporting member 74, i.e. of the second positioning cylinder 71 is completed to a circularly cylindrical surface at the location of the first slot portion 122. In this way it is achieved that in spite of the presence of the slot 120 in the tubular supporting member 74 the circumferential surface of this member 74, at least at the location of the rib 132, is a substantially continuous circularly cylindrical surface, which in conjunction with the opening 98 in the positioning plate 99 guarantees a correct mounting of the head support 40.

In the present case the rib 132 extends up to the disc-shaped portion 130 of the end member 125 and its portion between the cylindrical portion 129 and the hollow cylindrical portion 131 is widened to interconnect the cylindrical portion 129 and the hollow cylindrical portion 131, which improves the overall stability of the end member 125.

Figure 7:
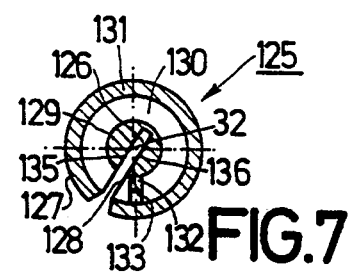
FIG. 7 shows the closing member in a sectional view taken on the line VII—VII in FIG. 6.

As appears in particular from FIG. 7, the end member 125 comprises two mutually parallel guide surfaces 135 and 136 for the conductor board 109, i.e. for the conductor board sections 112 and 113, at the location of the passage 126 for the flexible conductor board 109, between which guide surfaces the conductor board 109, i.e. its conductor board sections 112 and 113, is passed with clearance. Thus, at the location where it traverses the head support the flexible conductor board 109 is protected simply against twisting when the magnetic-head unit 28 is pivoted about the pivotal axis 28.

FIGS. 8 and 9 show a head support 40 of a magnetic-tape apparatus in accordance with a second embodiment of the invention. This head support 40 has two slots 137 and 138 which are diametrically opposed relative to the pivotal axis 32 and which each extend in the same direction as the pivotal axis 32 over the whole dimension of the head support 40. The head support 40 thus comprises two parts 139 and 140 which are separated from one another by the slots 137 and 138. For the passage of the conductor board sections 112 and 113 through the duct 72 of this head support 40 the two parts 139 and 140 of the head support 40 are separated from one another, after which the conductor board sections 112 and 113 are placed in the duct 72. Subsequently, the two parts 139 and 140 are reassembled to form the head support 40. To hold the two parts 139 and 140 together a ring 141 and a ring 142 are respectively slid onto the supporting disc 41 and onto the second positioning cylinder 71 of the tubular supporting member 74 in the direction of the pivotal axis 32. The principal advantage of the head support 40 as shown in FIGS. 8 and 9 resides in the fact that in this case a flexible conductor board can be mounted in a very simple way and that the widened connecting portions of the flexible conductor board can have an arbitrary width.

In the head support 40 shown in FIGS. 8 and 9, the supporting disc 41 has two bores 143 and 144 into which two fixing screws can be fitted to secure a suitably constructed magnetic-head unit to the supporting disc 41.

We claim:

1. A magnetic tape apparatus, comprising:
   a) a magnetic head unit for scanning a magnetic tape;
   b) a head support for carrying said magnetic head-unit;
   c) mounting means for rotatably mounting said head support such that said head support is rotatable about an axis of rotation, said head support having a head-end portion carrying said magnetic head unit, said head support extending through said mounting means and terminating at a distal end opposite said head-end, said head support having a duct extending from said magnetic head unit along the length of said support to said distal end; and
   d) a flat flexible conductor board extending through said duct along the entire length of said head support, said flexible conductor board having conductor tracks connected at one end to said magnetic head unit, at an opposing end said conductor board having a widened portion having a dimension larger than the diameter of said duct, and
   said head support including a slot which axially extends over the entire length of said head support and permits said widened portion of said conductor board to be passed through said slot and duct in a flat, unfolded condition from said head-end portion to said distal end.

2. A magnetic-tape apparatus as claimed in claim 1, wherein said head support comprises a cylindrical holding member carrying the magnetic head unit and a tubular supporting member defined by a tubular wall which extends from the tubular holding member and is coaxial with the axis of rotation, the cylindrical holding member having a larger radius than the tubular supporting member, and said slot comprises a first slot portion, which traverses the wall of the tubular supporting member over its entire length and extends in the direction of the axis of rotation, and a second slot portion, which partly passes through the holding member, is inclined relative to the first slot portion and terminates in the first slot portion.

3. A magnetic-tape apparatus as claimed in claim 2, further including an end member mounted on said tubular supporting member for at least partially axially closing said first slot portion in said tubular supporting member, which end member has a passage for said flexible conductor board, which passage extends in the direction of the axis of rotation, and a radially extending slot which extends radially from an outer surface of the end member up to said passage, through which slot said flexible conductor board can be introduced into said passage.

4. A magnetic-tape apparatus as claimed in claim 3, characterised in that the end member (125) comprises a rib (132) which extends radially from said duct of said head support into said first slot portion and closes an axial part of said first slot portion which the circumferential surface (134) of the tubular supporting member (74) is completed to a circularly cylindrical surface at the location of the first slot portion (122) (FIGS. 6, 7).

5. A magnetic-tape apparatus as claimed in claim 4, characterised in that said end member comprises two mutually parallel guide surfaces for the flexible conductor board, between which guide surfaces said conductor board is passed with clearance.

6. A magnetic-tape apparatus as claimed in claim 3, characterized in that said end member comprises two mutually parallel guide surfaces for said flexible conductor board, between which guide surfaces said conductor board is passed with clearance.

7. A magnetic tape apparatus, comprising:
   a) a magnetic head unit for scanning a magnetic tape;
   b) a signal processing means for processing signals from said magnetic head unit;
   c) a head support for carrying the magnetic head, said head support including a first tubular portion and a second elongate tubular portion defined by a circumferential wall, said first tubular portion carrying said magnetic head unit and having an outer diameter larger than the second tubular portion;
   d) mounting means for rotatably mounting said head support, said mounting means circumferentially supporting said first tubular portion of said head support such that said magnetic head unit is rotatable between first and second head positions about an axis of rotation;
   said head support having a duct extending from the magnetic head unit through both of said tubular portions along the axis of rotation of said support to a distal end of said head support opposite the magnetic head unit;
   e) a flat flexible conductor board extending through said duct along the entire length of said duct, said flexible conductor board having conductor tracks for connecting said magnetic head unit to said signal processing unit, said conductor board including a head end at which said conductor tracks are connected to said magnetic head unit and, at an opposing end, said conductor board having a widened portion which is wider than said duct and the portion of the conductor board extending through said duct,
   said head support further including a slot which extends over the entire length of said duct and permits said widened portion of said conductor board to be passed through said duct and said slot along the axis of rotation from said one end of said first tubular portion to said distal end of said head support in a flat, unfolded condition; and
   e) an end member mounted on the elongate tubular portion for at least partially closing said duct in said second tubular portion at said distal end of said head support, said end member having (i) a passage extending in the direction of the axis of rotation for accommodating the flexible conductor board, (ii) an end member slot which extends in the direction of the axis of rotation from an outer surface of the end member to said passage and through which the conductor board can be inserted into said passage, (iii) a radially extending rib which extends from said duct of said head support into a first portion of said head support slot adjacent said distal end of said head support, said rib having a rounded free end which closes said first portion of said head support and provides a smooth outer surface of the elongate tubular portion.

8. A magnetic tape apparatus according to claim 7, wherein said end member comprises two mutually parallel guide surfaces for guiding the flexible conductor board.

9. A magnetic tape apparatus according to claim 7, wherein said widened portion of said conductor board is stiffer than the portion of said conductor board extending through said duct.

10. A magnetic tape apparatus according to claim 7, wherein the head support is comprised by a single part.

11. A magnetic tape apparatus according to claim 7, wherein said head support comprises two opposing parts facing each other along the axis of rotation and a fixing ring circumferentially bounding and fixing said two parts together.

* * * * *